US012255836B2

(12) United States Patent
Sinicco et al.

(10) Patent No.: US 12,255,836 B2
(45) Date of Patent: Mar. 18, 2025

(54) INTERNAL FUNCTIONAL SPLIT IN AN O-RAN BASED MASSIVE MIMO RADIO UNIT AND INTERNAL COMMUNICATION PROTOCOLS

(71) Applicant: Outdoor Wireless Networks LLC, Claremont, NC (US)

(72) Inventors: Alessandro Sinicco, Monza (IT); Simone Reverzani, Monza (IT); Calogero Armao, Saronno (IT); Mario Fricchione, Milan (IT)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

(21) Appl. No.: 18/568,003

(22) PCT Filed: May 3, 2022

(86) PCT No.: PCT/US2022/027388
§ 371 (c)(1),
(2) Date: Dec. 7, 2023

(87) PCT Pub. No.: WO2022/260780
PCT Pub. Date: Dec. 15, 2022

(65) Prior Publication Data
US 2024/0267167 A1 Aug. 8, 2024

(30) Foreign Application Priority Data
Jun. 8, 2021 (IT) .................. 102021000014903

(51) Int. Cl.
*H04W 4/00* (2018.01)
*H04B 7/06* (2006.01)
*H04L 5/00* (2006.01)

(52) U.S. Cl.
CPC .......... *H04L 5/0005* (2013.01); *H04B 7/0617* (2013.01)

(58) Field of Classification Search
CPC ..... H04L 5/0005; H04B 7/0617; H04B 7/0695
See application file for complete search history.

(56) References Cited

U.S. PATENT DOCUMENTS

2020/0107204 A1   4/2020   Barabell et al.
2020/0358186 A1   11/2020  Tran et al.
(Continued)

FOREIGN PATENT DOCUMENTS

WO   WO-2021245441 A1 *  12/2021  ............ G01S 7/021
WO   WO-2022005709 A1 *  1/2022   ............ H04L 69/04
(Continued)

OTHER PUBLICATIONS

"O-RAN Fronthaul Working Group Control, User and Synchronization Plane Specification" O-RAN.WG4.CUS.0-v03.00 Technical Specification (253 pages) (Mar. 13, 2020).
(Continued)

*Primary Examiner* — Thai Dinh Hoang
(74) *Attorney, Agent, or Firm* — Myers Bigel, P.A.

(57) ABSTRACT

Active antennas are provided. An active antenna includes a main processor that is configured to perform processing of packets from an O-RAN interface of the main processor to provide a plurality of data streams. The active antenna also includes a plurality of secondary processors that are configured to process the data streams from the main processor.

19 Claims, 13 Drawing Sheets

(56) References Cited

U.S. PATENT DOCUMENTS

| | | | |
|---|---|---|---|
| 2021/0006371 A1 | 1/2021 | Raghothaman et al. | |
| 2021/0120531 A1 | 4/2021 | Jeon et al. | |
| 2021/0204148 A1* | 7/2021 | Chou | H04W 24/02 |
| 2021/0243840 A1* | 8/2021 | Raghothaman | H04L 5/0044 |
| 2021/0258969 A1* | 8/2021 | Yang | H04W 72/54 |
| 2022/0078631 A1* | 3/2022 | Salahuddeen | H04L 45/16 |
| 2022/0159525 A1* | 5/2022 | Chou | H04W 36/32 |
| 2022/0337973 A1* | 10/2022 | Lutsky | G01S 5/02216 |
| 2022/0369163 A1* | 11/2022 | Gundavelli | H04W 88/06 |
| 2022/0369182 A1* | 11/2022 | Gundavelli | H04W 36/0016 |
| 2022/0369324 A1* | 11/2022 | Gundavelli | H04W 72/30 |
| 2022/0369404 A1* | 11/2022 | Gundavelli | H04W 40/20 |
| 2022/0377597 A1* | 11/2022 | Kotaru | H04W 72/04 |
| 2022/0377650 A1* | 11/2022 | Kotaru | H04W 24/10 |
| 2023/0209549 A1* | 6/2023 | Amuru | H04W 28/02 370/329 |
| 2024/0007151 A1* | 1/2024 | Kim | H01Q 21/0006 |
| 2024/0007152 A1* | 1/2024 | Xu | H04B 1/40 |
| 2024/0007157 A1* | 1/2024 | Xu | H04B 7/0617 |
| 2024/0007158 A1* | 1/2024 | Kim | H04B 7/0617 |
| 2024/0007159 A1* | 1/2024 | Kaver | H01Q 23/00 |
| 2024/0007160 A1* | 1/2024 | Xu | H04B 7/0695 |
| 2024/0007264 A1* | 1/2024 | Anzil | H04B 1/40 |
| 2024/0039593 A1* | 2/2024 | Irvine | H01Q 3/40 |
| 2024/0098551 A1* | 3/2024 | Guchhait | H04W 28/0247 |

FOREIGN PATENT DOCUMENTS

| | | | | |
|---|---|---|---|---|
| WO | WO-2022272049 A1 | * | 12/2022 | H04W 24/02 |
| WO | WO-2024100075 A1 | * | 5/2024 | G06F 9/54 |
| WO | WO-2024100498 A1 | * | 5/2024 | H04B 7/0695 |

OTHER PUBLICATIONS

Notification of Transmittal of the International Search Report and the Written Opinion of the International Searching Authority, or the Declaration, in corresponding PCT Application No. PCT/US2022/027388 (Aug. 11, 2022).

O-RAN Open Xhaul Transport Working Group 9, Xhaul Transport Requirements, O-RAN.WG9.XTRP-REQ-v01.00, O-RAN alliance (73 pages) (Feb. 2021).

* cited by examiner

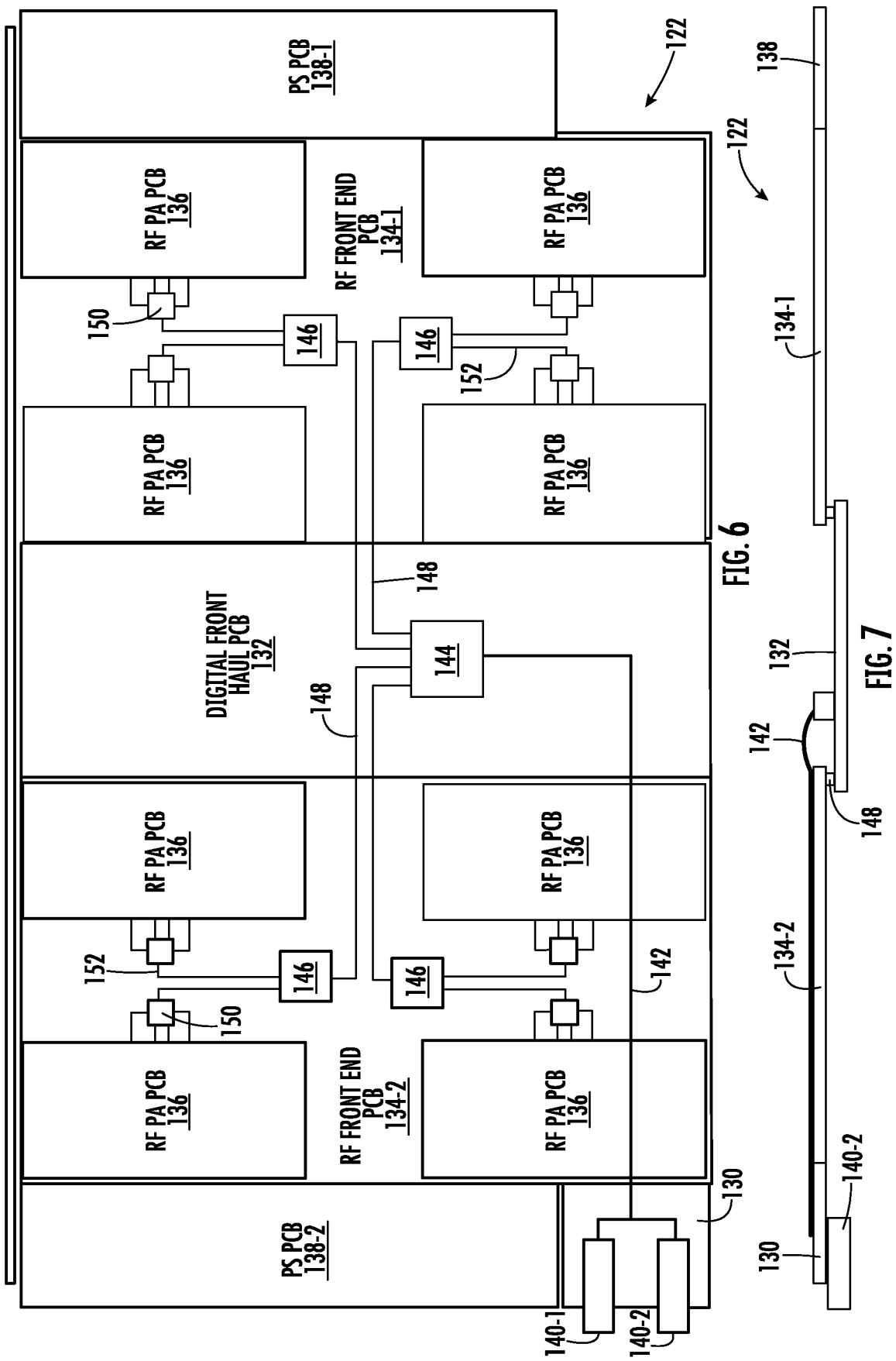

INTERNAL FUNCTIONAL SPLIT IN AN O-RAN BASED MASSIVE MIMO RADIO UNIT AND INTERNAL COMMUNICATION PROTOCOLS

CROSS-REFERENCE TO RELATED APPLICATIONS

The present application is a 35 U.S.C. § 371 national stage application of PCT Application No. PCT/US2022/027388, filed May 3, 2022, which claims priority to Italian Patent Application No. 102021000014903, filed Jun. 8, 2021, the entire contents of which are incorporated herein by reference. The above-referenced PCT application was published in the English language as International Publication No. WO 2022/260780 A1 on Dec. 15, 2022.

BACKGROUND

The present invention relates to cellular communications systems and, more particularly, to base station antennas having active antenna modules.

Cellular communications systems are well known in the art. In a cellular communications system, a geographic area is divided into a series of regions that are referred to as "cells" that are served by respective base stations. Each base station may include one or more base station antennas that are configured to provide two-way radio frequency ("RF") communications with mobile subscribers that are within the cell served by the base station. In many cases, each base station is divided into "sectors." In perhaps the most common configuration, a hexagonally-shaped cell is divided into three 120° sectors, and each sector is served by one or more base station antennas. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

With the introduction of fifth generation ("5G") cellular technologies, base station antennas are now routinely being deployed that have active beamforming capabilities. Active beamforming refers to transmitting RF signals through a multi-column array of radiating elements in which the relative amplitudes and phases of the sub-components of an RF signal that are transmitted (or received) through the different radiating elements of the array are adjusted so that the radiation patterns that are formed by the individual radiating elements constructively combine in one or more desired directions to form narrower antenna beams that have higher gain. With active beamforming, the shape and pointing direction of the antenna beams generated by the multi-column array may, for example, be changed on a time slot-by-time slot basis of a time division duplex ("TDD") multiple access scheme. Moreover, different antenna beams can be generated simultaneously on the same frequency resource in a multi-user MIMO scenario. More sophisticated active beamforming schemes can apply different beams to different physical resource blocks that are a combination of time and frequency resources by applying the beam vector in the digital domain. Base station antennas that have active beamforming capabilities are often referred to as active antennas. When the multi-column array includes a large number of columns of radiating elements (e.g., sixteen or more), the array is often referred to as a massive MIMO array. A module that includes a multi-column array of radiating elements and associated RF circuitry (and perhaps baseband circuitry) that implement an active antenna is referred to herein as an active antenna module. Active antenna modules may be deployed as standalone base station antennas, or may be deployed in larger antenna structures that include additional active antenna modules and/or conventional "passive" antenna arrays that are connected to radios that are external to the antenna structures.

SUMMARY

Pursuant to embodiments of the present invention, an active antenna may include a main processor including an O-RAN front-haul interface and a post-O-RAN interface that is coupled to an output of the O-RAN front-haul interface. The post-O-RAN interface may be configured to parse user-plane packets and control-plane packets received from the O-RAN front-haul interface to provide a plurality of output data streams in a frequency domain. Moreover, the active antenna may include a plurality of secondary processors that are configured to receive the output data streams, respectively, from the main processor and to transform data of the output data streams from the frequency domain into a time domain.

In some embodiments, the post-O-RAN interface of the main processor may be further configured to apply a plurality of beamforming weights in the frequency domain. Moreover, the post-O-RAN interface of the main processor may be still further configured to compress beamforming-weighted data.

According to some embodiments, the O-RAN front-haul interface of the main processor may be configured to receive an input data stream via an Ethernet link and to output the user-plane packets and the control-plane packets based on the input data stream. Moreover, the active antenna may include an optical connector that is coupled between the Ethernet link and a baseband unit.

In some embodiments, the data of the output data streams may include user-plane data of a protocol for downlink communications from the main processor to the secondary processors. The output data streams may further include control-plane information of the protocol. The secondary processors may be further configured to separate the user-plane data of the protocol from the control-plane information of the protocol. Moreover, the secondary processors may be still further configured to: decompress the user-plane data of the protocol; and apply antenna calibration parameters to the user-plane data of the protocol in the frequency domain. In other embodiments, the post-O-RAN interface may be further configured to apply antenna calibration parameters in the frequency domain.

According to some embodiments, the main processor may be a main field programmable gate array ("FPGA") and the secondary processors may be a plurality of secondary FPGAs, respectively, that are coupled to the main FPGA. Moreover, the active antenna may include an array of radiating elements, and the main processor and the secondary processors may be on a back side of the array of radiating elements.

In some embodiments, the main processor may include a pre-O-RAN interface that is coupled to an input of the O-RAN front-haul interface. The pre-O-RAN interface may be configured to generate user-plane packets using data received from the secondary processors through a protocol for uplink communications from the secondary processors to the main processor.

According to some embodiments, the post-O-RAN interface of the main processor may be further configured to continue sending the output data streams to the secondary processors when no data is available from the O-RAN front-haul interface of the main processor. Moreover, the output data streams may include dummy values when no data is available from the O-RAN front-haul interface of the main processor. For example, the dummy values may all be zeros.

An active antenna, according to some embodiments, may include a main processor including an O-RAN front-haul interface and a post-O-RAN interface that is coupled to an output of the O-RAN front-haul interface. The active antenna may include a plurality of secondary processors. The main processor may be configured to output a plurality of data streams to the secondary processors, respectively. Moreover, each of the data streams may include a header that includes control-plane information.

In some embodiments, the control-plane information may include timing information. For example, the timing information may include a frame number of a radio frame, symbol information, and slot information.

According to some embodiments, the control-plane information may include data-compression information. Moreover, the control-plane information may include physical random access channel ("PRACH") information. The PRACH information may include, for example, PRACH slot information and/or PRACH frequency information.

In some embodiments, each of the data streams may include a guard section. Moreover, the header that includes the control-plane information may be in the guard section.

According to some embodiments, the data streams may be respective downlink data streams. Moreover, the main processor may be further configured to receive a plurality of uplink data streams from the secondary processors, respectively. Each of the uplink data streams may include user-plane data, PRACH data, and a header.

In some embodiments, each of the data streams may include I/Q data for a plurality of RF channels. The header that includes the control-plane information may be in a first word of a first of the data streams. A first frequency point of the first of the data streams may include I/Q data in a second word of the first of the data streams. Moreover, the first word of the header may have a first number of bits that is equal to a second number of bits of the second word that has the I/Q data therein.

According to some embodiments, the header that includes the control-plane information may be part of a packet-based protocol that also includes I/Q data. Moreover, each of the data streams may include a plurality of frequency points. A first group of the frequency points may include the header that includes the control-plane information. A second group of the frequency points may include I/Q data.

BRIEF DESCRIPTION OF THE DRAWINGS

FIGS. 6 and 7 are schematic front and side views, respectively, of the active circuit layer included in the active antenna module of FIG. 4.

DETAILED DESCRIPTION

Pursuant to embodiments of the present invention, main and secondary processors are provided that may be used, for example, in active antenna modules for cellular communications systems. A single processor chip/device may not be able to perform all of the functions that are demanded by a massive MIMO (e.g., 32T32R) array. Accordingly, by splitting processing functions between main and secondary processors, the demands of a massive MIMO array can be better addressed.

An issue then arises as to how to split the processing functions between the main and secondary processors. For example, the size and processing requirements of the main processor may be reduced by using the secondary processors to convert between frequency and time domains. Such a reduction in size and processing requirements for the main processor may improve heat dissipation and reduce the overall cost of an active antenna module having the main and secondary processors.

Moreover, control-plane information of a downlink protocol can be communicated from the main processor to the secondary processors during a frequency guard band. Because the guard band will not be fully used, it can provide room for both the control-plane information and relaxed timing requirements. For example, user-plane data in the frequency domain may require less bandwidth with respect to the final conversion in the time domain. On the other hand, some real time control-plane information may still be necessary to allow the full conversion. Also, by splitting the processing functions relatively evenly, requirements for system throughput may be decreased, thus allowing for a lower-speed link (or for a smaller number of links) between the main and secondary processors.

As discussed above, the main and secondary processors according to embodiments of the present invention may be part of an active antenna module that provides 5G communications capability. Before discussing the main and secondary processors according to embodiments of the present invention, an example active antenna module in which these processors may be used will be discussed in greater detail.

Figure 1A:
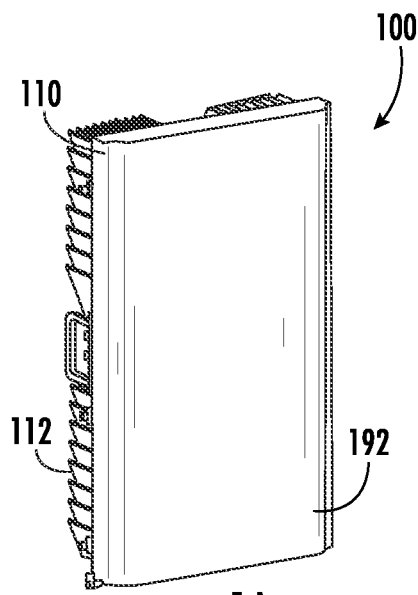
FIGS. 1A and 1B are perspective front and back views, respectively, of an active antenna module that may include main and secondary processors according to embodiments of the present invention.
Figure 1B:
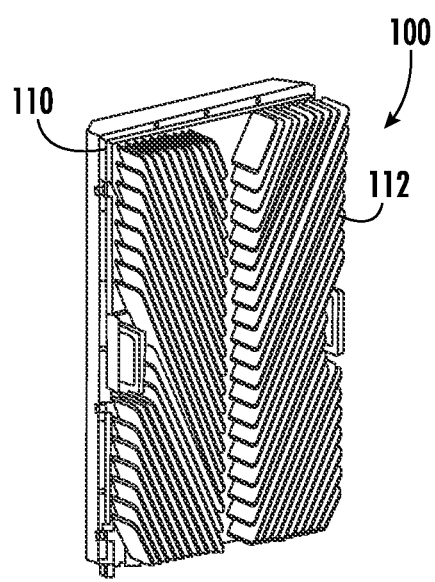

FIGS. 1A and 1B are perspective front and back views, respectively, of an active antenna module 100 that may include processors according to embodiments of the present invention. As shown in FIGS. 1A and 1B, the active antenna module 100 includes a housing 110 and an outer radome 192. The housing 110 may include heat fins 112 that are used to dissipate heat generated by active circuit components that are mounted within the housing 110. The housing 110 with heat fins 112 forms the rear side of the active antenna module 100. The radome 192 may be formed of a dielectric material that is substantially transparent to RF radiation in the operating frequency band of the active antenna module 100. The radome 192 may be mounted forwardly of the housing 110 and may cover and protect a multi-column array of radiating elements that is included in the active module 100.

The active antenna module 100 may be used as a stand-alone antenna. When used in this fashion, the active antenna module 100 may be mounted on a raised structure with the radiating elements thereof pointing outwardly so that they can form antenna beams in the direction of the intended coverage area for the active antenna module 100. A pair of fiber optic cables may extend between the active antenna module 100 and a baseband unit (not shown).

The active antenna module may alternatively be integrated into a larger "passive" base station antenna. A passive base station antenna refers to a base station antenna that includes one or more arrays of radiating elements that generate relatively static antenna beams. Passive base station antennas include RF connectors or "ports" that are connected to external radios.

Figure 2A:
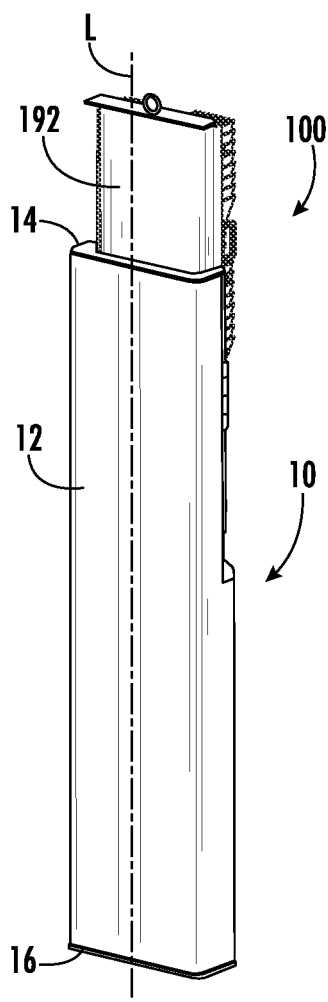
FIGS. 2A and 2B are perspective front and back views, respectively, of the active antenna module of FIGS. 1A-1B partially slid into place within a larger passive base station antenna.
Figure 2B:
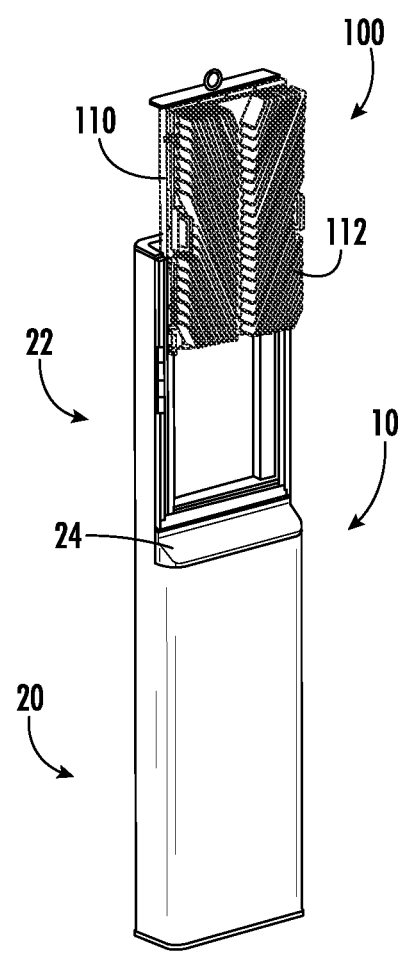

FIGS. 2A and 2B are perspective front and back views, respectively, of the active antenna module 100 of FIGS. 1A-1B partially slid into place within a larger passive base station antenna 10. The passive base station antenna 10 may comprise an elongated structure that extends along a longitudinal axis L. The passive base station antenna 10 includes a radome 12 and a first top end cap 14. The passive base station antenna 10 also includes a bottom end cap 16 which includes a plurality of RF ports 18 (FIGS. 3A-3B) mounted therein. The RF ports 18 are connected to external radios (not shown) that are connected to the arrays of radiating elements of the passive base station antenna 10. The passive base station antenna 10 is typically mounted in a vertical configuration (i.e., the longitudinal axis L may be generally perpendicular to a plane defined by the horizon when the passive base station antenna 10 is mounted for normal operation).

The depth of the upper portion 22 of the passive base station antenna 10 is less than the lower portion 20 of the passive base station antenna 10. The rear side of the upper portion 22 of the passive base station antenna 10 is recessed. This allows the active antenna module 100 to be pushed or slid into place and secured to the upper rear side of the passive base station antenna 10. The lower portion 20 of the passive base station antenna 10 includes a second top end cap 24.

Figure 3A:
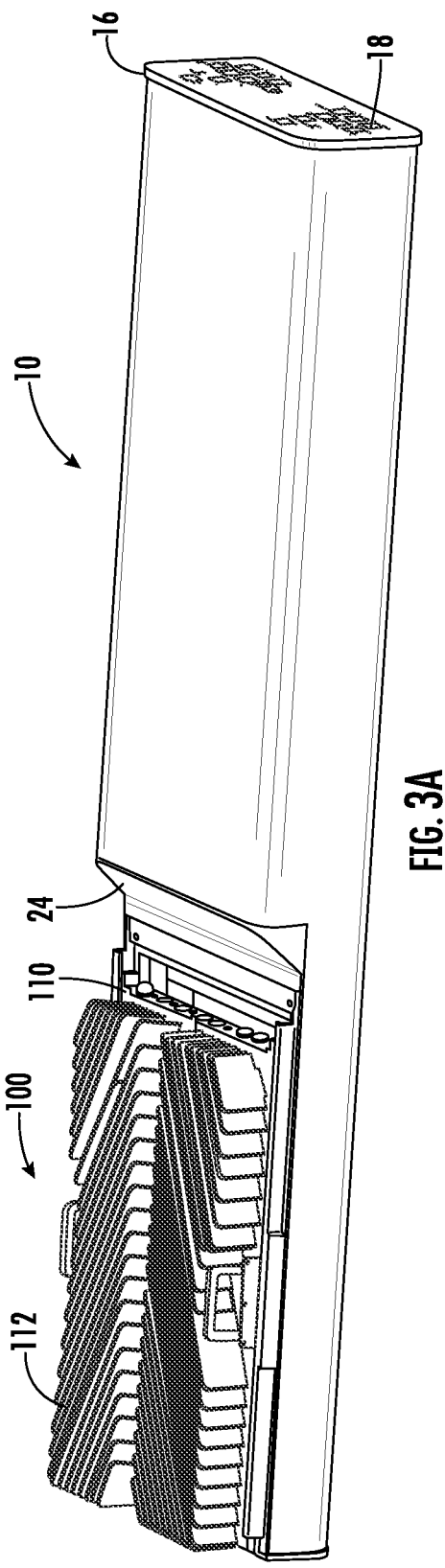
FIG. 3A is a perspective back view of the passive base station antenna of FIGS. 2A-2B with the active antenna module fully installed therein.
Figure 3B:
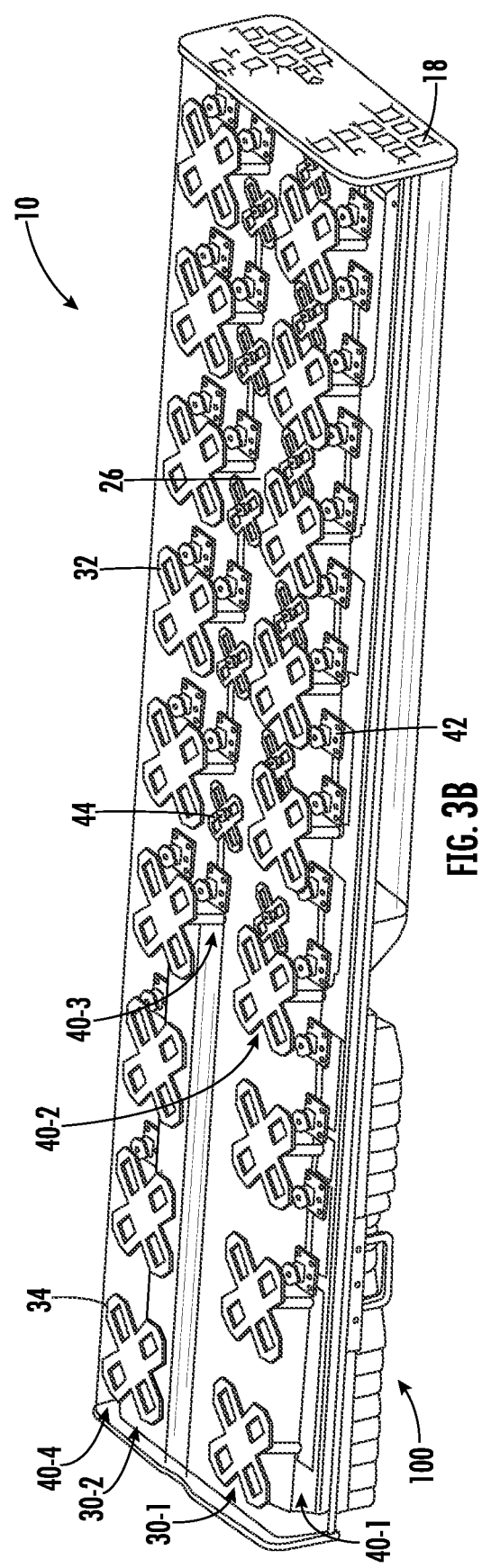
FIG. 3B is a shadow perspective front view of the antenna of FIGS. 2A-2B that schematically illustrates the linear arrays of radiating elements included in the passive base station antenna.

FIG. 3A is a rear perspective view of the passive base station antenna 10 with the active antenna module 100 fully integrated therein. FIG. 3B is a shadow perspective front view of the passive base station antenna 10 with the active antenna module 100 integrated therein that schematically illustrates the linear arrays of radiating elements included in the passive base station antenna 10. As shown in FIG. 3B, the passive base station antenna 10 includes one or more reflectors 26. Various components of the passive antenna 10 may be mounted behind the lower portion of the reflector 26, such as remote electronic tilt units, phase shifters, diplexers, controllers and the like (not shown). A pair of linear arrays 30-1, 30-2 of low-band radiating elements 32, 34 and four linear arrays 40-1 through 40-4 of mid-band radiating elements 42, 44 are mounted to extend forwardly from the reflector 26. The low-band radiating elements 32, 34 may comprise slant −45°/+45° cross dipole radiating elements that are configured to transmit and receive RF signals in all or part of the 617-960 MHz frequency range. The low-band radiating elements 34 differ from the low-band radiating elements 32 in that they have slanted feed stalks so that the active antenna module 100 can fit in between the two low-band linear arrays 30-1, 30-2.

The mid-band radiating elements 42, 44 may also comprise slant −45°/+45° cross dipole radiating elements that are configured to transmit and receive RF signals in all or part of the 1427-2690 MHz frequency range. In the depicted embodiment, the outer mid-band linear arrays 40-1 and 40-4 include mid-band radiating elements 42 that are configured to transmit and receive RF signals in the 1695-2690 MHz frequency range (or alternatively the 1427-2690 MHz frequency range), while the inner mid-band linear arrays 40-2 and 40-3 include mid-band radiating elements 44 that are configured to transmit and receive RF signals in the full 1427-2690 MHz frequency range. The radiating elements of the active antenna module 100 are not shown in FIG. 3B to simplify the drawing.

Passive base station antennas that are designed for use with integrated active antenna modules are discussed in detail in U.S. patent application Ser. No. 17/209,562 ("the '562 application"), the entire content of which is incorporated herein by reference. The passive base station antenna 10 and the active antenna module 100 may have the mechanical designs of any of the passive base station antennas and active antenna modules disclosed in the above-referenced '562 application.

Figure 4:
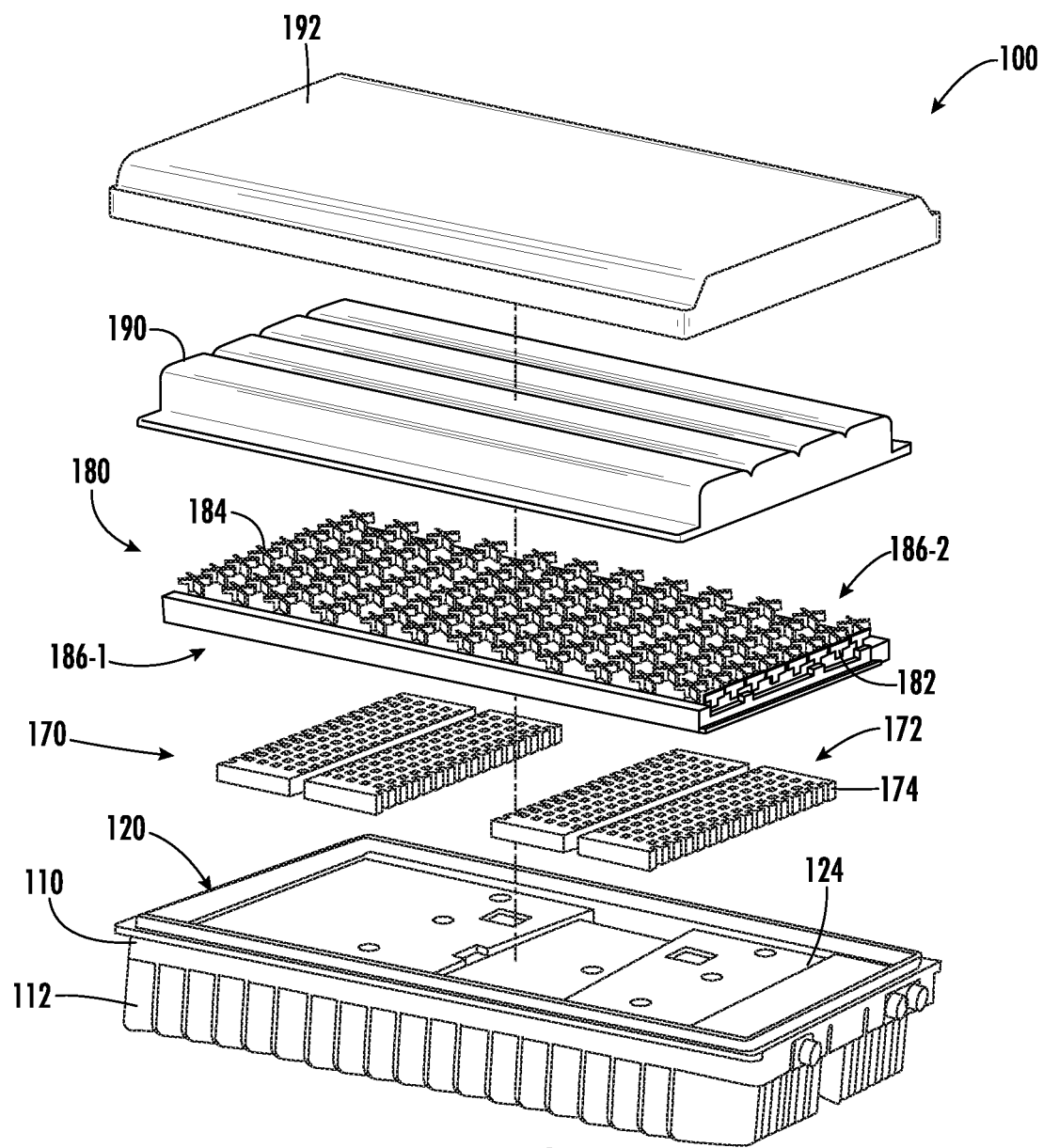
FIG. 4 is an exploded perspective view of the active antenna module of FIGS. 1A-1B.

FIG. 4 is an exploded schematic perspective view of the active antenna module 100. As shown in FIG. 4, the rearmost portion of the active antenna module 100 is the housing 110 having heat fins 112. The housing 110 may comprise a metal frame and the heat fins 112 may be formed integrally with the housing 110. The bottom surface of the housing 110 and the heat fins act as a heat sink. Heat spreading structures (not shown) such as vapor chambers, heat pipes or any other high thermal conductivity material, structure or assembly may also be mounted in the housing 110 adjacent regions where high heat density occurs during device operation. The heat spreading structures may facilitate spreading heat from a small area (e.g., the area behind active circuits in the active circuit layer 120) to a much larger area so that the heat may be vented from the active antenna module 100 through the heat fins 112.

An "active circuit layer" 120 is mounted forwardly of the heat spreading structures. The active circuit layer 120 may comprise a printed circuit board structure 122 (not visible in FIG. 4, but shown in FIGS. 5 and 6-7) and an EMI shield 124 that covers and protects the printed circuit board structure 122. The printed circuit board structure 122 may include multiple printed circuit boards that have processors as well as baseband and RF circuit components mounted thereon such as field programmable gate arrays, amplifiers, oscillators, switches, circulators, up-converters, down-converters and the like. The EMI shield 124 may comprise a metal (e.g., aluminum) structure that may be formed by, for example, die casting. The EMI shield 124 shields the circuits and transmission lines in the active circuit layer 120 from RF radiation from external sources, and prevents RF energy radiated from the active circuit layer 120 from impacting other circuits/elements in the active antenna module 100 or the passive antenna 10. Electrical connections may extend through the EMI shield 124 to facilitate connecting circuit elements in the active circuit layer 120 to the filter layer 170. The active circuit layer 120 will be described in greater detail below with reference to FIGS. 5 and 6-7. Various of the processors and baseband/RF circuit components may generate significant amounts of heat. By providing vapor chambers or other heat spreading structures directly behind the highest heat generating circuits of the active circuit layer 120, the heat generated by such circuits may be more efficiently vented from the active antenna module 100.

A filter layer 170 is mounted forwardly of the active circuit layer 120. The filter layer 170 includes a plurality of RF filters 174. The RF filters 174 may be formed as filter banks 172 that each include a plurality of RF filters 174 that share a common housing. In the depicted embodiment, a total of four filter banks 172 are provided that each include eight RF filters 174 that are formed in a common housing. Each RF filter 174 may comprise a resonant cavity bandpass filter that is configured to pass RF signals in the operating frequency band of the active antenna module 100. The filters 174 are mounted directly on the EMI shield 124.

An antenna layer 180 is provided forwardly of the filter layer 170. The antenna layer 180 may include a reflector 182 and a plurality of radiating elements 184. The reflector 182 may comprise, for example, a metallic sheet or a frequency selective surface that is designed to reflect RF energy in the operating frequency range of the radiating elements 184 of the active antenna module 100. The radiating elements 184 may comprise, for example, slant −45°/+45° cross dipole radiating elements that are configured to transmit and receive RF signals in the operating frequency range of the active antenna module 100. This operating frequency range may, for example, comprise all or a portion of the 3.1-4.2 GHz frequency range or all or a portion of the 5.1-5.8 GHz frequency range. In an example embodiment, the operating frequency range may be the 3.4-3.8 GHz frequency band. The radiating elements 184 may be arranged in a plurality of rows and columns. In the depicted embodiment, a total of eight columns having twelve radiating elements 184 each are provided. As will be explained below, the upper and lower half of each column are fed by different transceivers so that the active antenna module 100 operates as two separate eight column arrays 186-1, 186-2 of radiating elements 184 that are stacked along the longitudinal axis of the active antenna module 100. As a result, the active antenna module 100 effectively includes sixteen columns of radiating elements 184 (namely two arrays 186 with eight columns each, where each column includes six radiating elements 184). Since the radiating elements 184 are dual-polarized radiating elements, this means that the active antenna module 100 effectively has thirty-two columns of radiators that can simultaneously transmit or receive RF signals.

An inner radome 190 covers and protects the antenna layer 180. An outer radome 192 covers the inner radome 190. The function and operation of the inner and outer radomes 190, 192 are described in more detail in the above-referenced '562 application.

Figure 5:
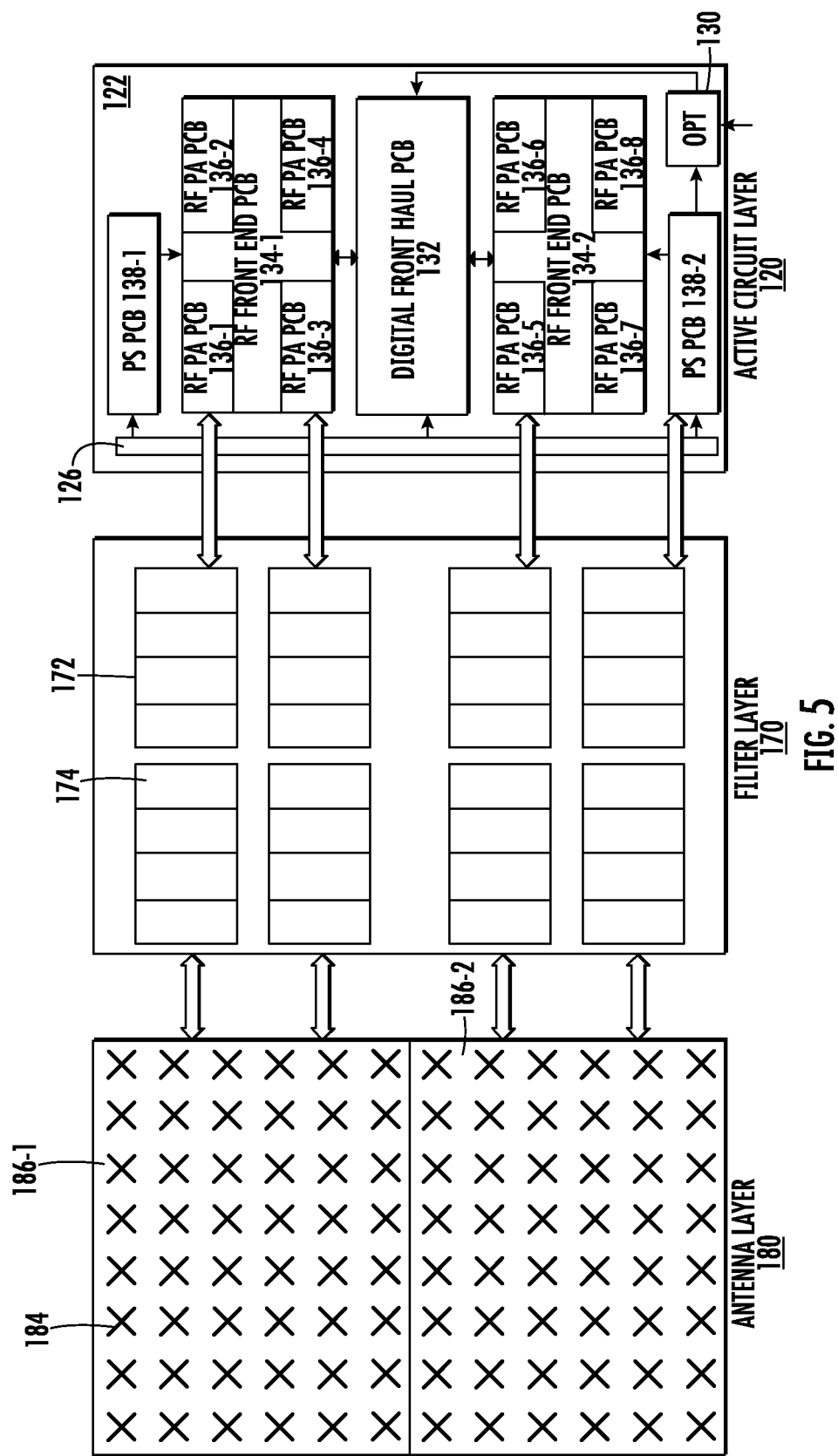
FIG. 5 is a schematic diagram of the active circuit layer, the filter layer and the antenna layer of the active antenna module of FIG. 4.

FIG. 5 is a schematic diagram of the printed circuit board structure 122 of the active circuit layer 120, the filter layer 170 and the antenna layer 180. As shown in FIG. 5, the printed circuit board structure 122 includes an optical interface printed circuit board ("PCB") 130, a digital front haul printed circuit board 132, a pair of RF front end printed circuit boards 134-1, 134-2, and a pair of power supply printed circuit boards 138-1, 138-2. Each RF front end printed circuit board 134 may have a plurality of RF power amplifier ("PA") printed circuit boards 136 mounted thereon. Each RF PA printed circuit board 136 supports four RF channels, and hence a total of eight RF printed circuit boards 136 are provided to support thirty-two channels that are coupled to the respective thirty-two columns of radiators discussed above. The active circuit layer 120 may further include a power bar or other power bus 126. The power bus may connect to each of the power supply printed circuit boards 138 and to the digital front haul printed circuit board 132.

The digital front haul printed circuit board 132 may be mounted in the middle of the heat sink, and may be placed directly on a first of the vapor chambers. The first and second RF front end printed circuit boards 134-1, 134-2 may be mounted on either side of the digital front haul printed circuit board 132, and may likewise be mounted directly on respective second and third vapor chambers. Four RF PA printed circuit boards 136 are mounted on each RF front end printed circuit board 134, and may be soldered onto or press fit on the front surfaces of the RF front end printed circuit boards 134. The digital front haul printed circuit board 132 and the first and second RF front end printed circuit boards 134 may be formed using conventional low cost printed circuit boards formed using FR4 or the like. The RF PA printed circuit boards 136 may be formed using dielectric materials that have low insertion losses for RF signals.

The filter layer 170 includes the above-described banks 172 of resonant cavity filters 174. A total of thirty-two resonant cavity filters 174 are provided, with each resonant cavity filter 174 coupled to a respective one of the transmit/receive chains on the RF PA printed circuit boards 136. As noted above, the filters 174 may be mounted directly on the EMI shield 124 that covers and protects the printed circuit boards of the active circuit layer 120.

First and second resonant cavity filters 174 are coupled to each of the sixteen columns of radiating elements 184, where the first resonant cavity filter 174 is coupled to the slant −45° radiators of the radiating elements 184 in the column, and the second resonant cavity filter 174 is coupled to the slant +45° radiators of the radiating elements 184 in the column.

FIGS. 6 and 7 are schematic front and side views, respectively, of the printed circuit board structure 122 of the active circuit layer 120. As shown in FIG. 6, a pair of optical connector modules 140-1, 140-2 are provided on the optical interface printed circuit board 130. Each optical connector module 140 may have the same design, with two optical connector modules 140 provided to double the throughput and/or to provide redundancy. Each optical connector module 140 is a bidirectional device that includes a fiber optic connector, an integrated optical-to-electrical converter that converts optical digital baseband data received at the connector modules 140 into an electrical baseband data stream and an integrated electrical-to-optical converter that converts an electrical baseband data stream that is received from the digital front haul printed circuit board 132 into digital optical signals.

A high-speed cable assembly 142 connects the first and second optical connectors 140 to a main FPGA 144 that is mounted on the digital front haul printed circuit board 132. The main FPGA 144 may perform various functions including O-RAN processing and digital beamforming. The main FPGA 144 is connected to four secondary FPGAs 146 that are mounted on the RF front end printed circuit boards 134 (two secondary FPGAs 146 are provided per RF front end printed circuit board 134). High-speed board-to-board connectors 148 are used to connect the main FPGA 144 to each of the secondary FPGAs 146. Each secondary FPGA 146 may perform additional processing.

Each secondary FPGA 146 is connected to a pair of RF transceivers 150. Four RF transceivers 150 are located on each of the RF front end printed circuit boards 134, with each RF transceiver 150 being associated with a respective one of the RF PA printed circuit boards 136. Each secondary FPGA is 146 coupled to its associated two RF transceivers 150 by a pair of JESD transmission paths 152.

Each RF transceiver 150 includes a digital-to-analog converter, an I/Q modulator (including a local oscillator) that, for downlink signals, converts an input digital data stream into four RF signals. The RF transceivers 150 likewise include an analog-to-digital converter and an I/Q demodulator that demodulate four RF uplink signals and convert the demodulated data into a digital data stream. Thus, each RF transceiver 150 comprises the front end of four transmit/receive chains. Each RF PA printed circuit board 136 includes the back end of four transmit/receive chains, including filters, high power amplifiers, low noise amplifiers, amplifier predistortion circuitry and transmit/receive path switching. Thus, the eight RF transceivers 150 and the eight RF PA printed circuit boards 136 together form thirty-two transmit/receive chains. The output of each transmit/receive chain may be coupled to a respective one of the filters 174 in the filter layer 170.

FIG. 7 is a schematic side view of the printed circuit board structure 122 of the active circuit layer 120. As shown in FIG. 7, the digital front haul printed circuit board 132 may be offset rearwardly from the two RF front end printed circuit boards 134 so that high-speed board-to-board connectors 148 may be used to connect each RF front end printed circuit board 134 to the digital front haul printed circuit board 132. FIG. 7 also illustrates the high-speed cable assembly 142 that connects the optical connectors 140-1, 140-2 to the digital front haul printed circuit board 132.

Figure 8:
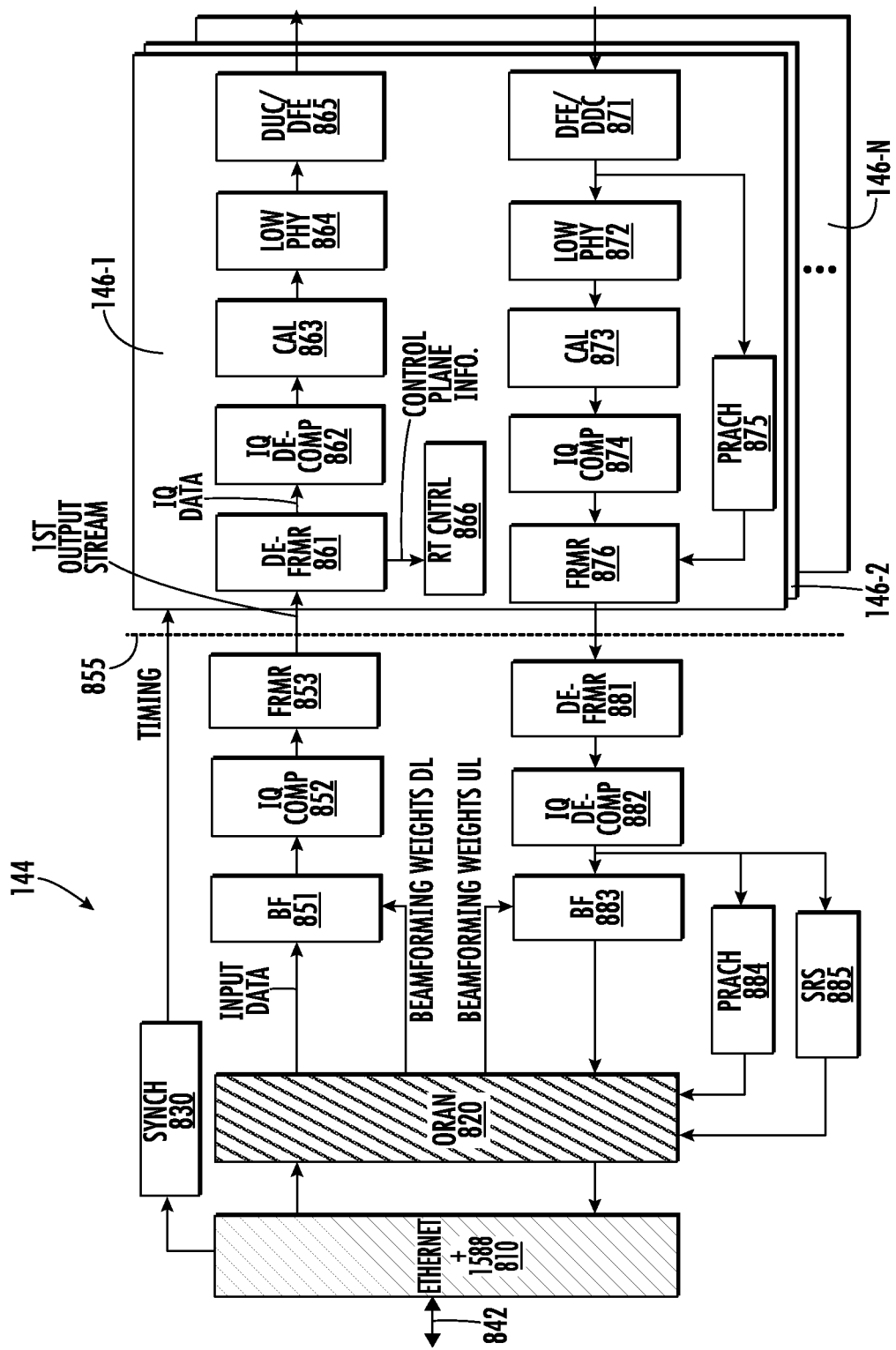
FIG. 8 is a schematic block diagram of modules of a main field programmable gate array, and modules of a first of a plurality of secondary field programmable gate arrays, of FIG. 6, according to embodiments of the present invention.

FIG. 8 is a schematic block diagram of modules of the main FPGA 144, and modules of a first FPGA 146-1 of the secondary FPGAs 146, of FIG. 6, according to embodiments of the present invention. The present invention is not limited, however, to FPGAs. Rather, FPGAs are one example of processors that can include the modules shown in FIG. 8. In some embodiments, Application Specific Integrated Circuits ("ASICs") or other processors may include the modules that are shown in FIG. 8. The modules shown in FIG. 8 may thus be included in either FPGA processors or non-FPGA processors.

As shown in FIG. 8, the main FPGA 144 includes an Ethernet-plus-1588 module 810 and an O-RAN module 820 that are each used for both downlink and uplink communications. Specifically, the O-RAN module 820 controls both downlink and uplink data flows. Likewise, the main FPGA 144 includes a synchronization module 830 that is coupled to the Ethernet-plus-1588 module 810 and that can serve the entire system, in both downlink and uplink directions. The main FPGA 144 also has downlink-only modules, including a beamforming module 851, an I/Q compression module 852, and a framer module 853. Moreover, the main FPGA 144 has uplink-only modules, including a de-framer module 881, an I/Q decompression module 882, a beamforming module 883, a PRACH module 884, and a sounding reference signal ("SRS") module 885.

As the O-RAN module 820 may be an O-RAN front-haul interface of the main FPGA 144, each of the downlink-only modules of the main FPGA 144 may be referred to herein as being part of a "post-O-RAN interface" of the main FPGA 144. The post-O-RAN interface is configured to parse packets, including (i) user-plane packets and (ii) control-plane packets, that are received from the O-RAN front-haul interface to provide a plurality of output data streams in a frequency domain. The control-plane packets that are received from the O-RAN front-haul interface may be based on control-plane information that is generated by a base station (operating in the frequency domain) of the active antenna module 100. Also, each of the uplink-only modules of the main FPGA 144 may be referred to herein as being part of a "pre-O-RAN interface" of the main FPGA 144. The pre-O-RAN interface is configured to generate packets, including user-plane packets, using data received through an uplink protocol from secondary FPGAs 146 to provide uplink user-plane data to the O-RAN front-haul interface.

The main FPGA 144 may always receive all symbols from the secondary FPGAs 146, including those where no mobile users are scheduled. Though the main FPGA 144 may not discard any data, it may transmit back to the baseband unit only the symbols/data that are explicitly requested by the baseband unit through control-plane messages.

The Ethernet-plus-1588 module 810 is coupled to a bidirectional Ethernet link 842, which may be implemented, for example, as a high-speed cable assembly 142 (FIG. 6). The main FPGA 144 is configured to receive an input data stream via the Ethernet link 842. For example, the input data stream may be an electrical baseband data stream that was converted from optical digital baseband data received at optical connector module(s) 140 (FIG. 6) from a baseband unit that is at the bottom of a tower that supports an active antenna module 100 (FIG. 4). The input data stream may include (i) user-plane data, (ii) control-plane data (e.g., scheduling information, beamforming information), and (iii) synchronization-plane data (for the synchronization module 830).

Based on the input data stream, the Ethernet-plus-1588 module 810 (a) recognizes packets having an O-RAN protocol, (b) separates the synchronization-plane data from the control-plane data and the user-plane data, (c) reformats the user-plane packets and the control-plane packets for delivery to the O-RAN module 820, and (d) outputs downlink data packets (e.g., the reformatted user-plane packets and control-plane packets) to the O-RAN module 820. Moreover, the "1588" portion of the Ethernet-plus-1588 module 810 outputs clock timing/synchronization information (e.g., of/based on the synchronization-plane data) to the synchronization module 830. The synchronization module 830 outputs timing information that ensures that data streams output by the main FPGA 144 arrive at respective secondary FPGAs 146 at the same time. In some embodiments, the synchronization module 830 may provide synchronization for the entire system, including the main FPGA 144 and the secondary FPGA 146, in both downlink and uplink directions.

The O-RAN module 820 provides data extracted from downlink data (e.g., user-plane) packets to the beamforming module 851. This data that is input to the beamforming module 851 comprise frequency-domain I/Q data. The beamforming module 851 also receives downlink beamforming weights from the O-RAN module 820. For example, the O-RAN module 820 can send a different beamforming weight for each RF channel (e.g., different weight vectors for each possible stream of data scheduled on the same time slot and frequency resource). The beamforming module 851 then applies, in the frequency domain, the downlink beamforming weights to different RF channels of the active antenna module 100 (e.g., the frequency-domain data is divided into thirty-two sub-components that correspond to thirty-two transmit/receive chains, and the beamforming weights generated by the O-RAN module 820 are applied to the thirty-two sub-components). Different mobile users may be served by the active antenna module 100 at the same time (e.g., by reusing time-frequency resources) or in different respective time slots, and different respective downlink beamforming weights may be applied for the different users.

The beamforming module 851 outputs data to the I/Q compression module 852, which compresses the data in the frequency domain. For example, the beamforming module 851 may output data to which it has applied the downlink beamforming weights, and the I/Q compression module 852 can compress such beamforming-weighted data. The I/Q compression module 852 outputs the compressed data to the framer module 853.

The framer module 853, which may comprise a transport layer and a physical layer, sends respective data streams to the secondary FPGAs 146. Accordingly, the framer module 853 outputs a first data stream to the first secondary FPGA 146-1, a second data stream to a second secondary FPGA 146-2, and an Nth data stream to an Nth secondary FPGA 146-N. In some embodiments, the framer module 853 may comprise, for example, an Ethernet layer or a custom point-to-point high-speed physical layer.

Each secondary FPGA 146 includes downlink modules and uplink modules. The downlink modules include a de-framer module 861, an I/Q decompression module 862, a calibration module 863, a low physical-layer ("PHY") module 864, a digital upconverter/digital front end ("DUC/DFE") module 865, and a real-time ("RT") control module 866.

The de-framer module 861 de-frames data packets that are received in the data stream from the main FPGA 144. For example, the de-framer module 861 can separate (i) I/Q data of the data stream from (ii) control-plane information of the data stream. The de-framer module 861 outputs the I/Q data and the control-plane information to the I/Q decompression module 862 and RT control module 866, respectively.

The RT control module 866 can understand from the control-plane information that PRACH processing will be needed for a PRACH transmission that will arrive. The control-plane information may be part of the overhead of the data stream.

The I/Q decompression module 862 decompresses the I/Q data that it receives from the de-framer module 861. The I/Q decompression module 862 then sends the decompressed I/Q data to the calibration module 863, which applies antenna calibration parameters to the I/Q data in the frequency domain. Such parameters may compensate for amplitude and phase-delay differences among different RF transmission paths.

The low-PHY module 864 receives the calibrated frequency-domain I/Q data from the calibration module 863 and transforms the calibrated data from the frequency domain into the time domain. For example, the low-PHY module 864 may be configured to perform an inverse fast Fourier transform ("IFFT") on the calibrated I/Q data. Moreover, the low-PHY module 864 adds a cyclic prefix ("CP"), which can save bandwidth due to being added by the secondary FPGA 146 in the time domain rather than transmitted in the frequency domain from the main FPGA 144 to the secondary FPGA 146.

The DUC/DFE module 865 receives time-domain data from the low-PHY module 864. For example, the DFE portion of the DUC/DFE module 865 may include one or more interpolators that increase the data rate of the time-domain data. In some embodiments, the DFE portion, which can be either inside or outside the secondary FPGA 146, can include a digital-to-analog converter ("DAC") and can perform (i) digital pre-distortion ("DPD") and/or (ii) crest factor reduction ("CFR") to ensure that power levels are appropriate for a desired level of efficiency.

Moreover, the DUC portion of the DUC/DFE module 865 may include a channel filter and may increase the sample rate of the time-domain data. As an example, the presence of multiple carriers (e.g., due to multiple cells) may necessitate an increased sample rate. In some embodiments, the same DUC/DFE module 865 can receive outputs from multiple low-PHY modules 864 of respective downlink data flows. The DUC/DFE module 865 outputs its converted data to a plurality of RF channels of the active antenna module 100, where the channels are coupled to respective columns of radiators of the active antenna module 100. Moreover, in some embodiments, the low-PHY module 864 can consume any remaining control-plane data of the downlink protocol between the main FPGA 144 and the secondary FPGA 146, and thus no control-plane data of the downlink protocol may be transmitted from the low-PHY module 864 to the DUC/DFE module 865.

The uplink modules of the secondary FPGAs 146 include a DFE/digital downconverter ("DDC") module 871, a low-PHY module 872, a calibration module 873, an I/Q compression module 874, a PRACH processing module 875, and a framer module 876. Some of these uplink modules may perform inverse functions relative to corresponding downlink modules of the secondary FPGAs 146.

For example, the DFE/DDC module 871 can reduce the sample rate and the data rate of data received via radiating elements 184 (FIG. 4) of the active antenna module 100 and may apply required channel filtering. The low-PHY module 872 may be configured to perform CP removal and an FFT to transform time-domain data from the DFE/DDC module 871 into frequency-domain data. Moreover, the I/Q compression module 874 can compress frequency-domain data, and the framer module 876 can combine compressed I/Q data from the I/Q compression module 874 with an output of the PRACH processing module 875.

The DUC/DFE module 865 and the DFE/DDC module 871 are not limited to a particular upconverter/downconverter architecture. Rather, these modules may be configured to perform, for example, direct RF conversion, zero intermediate frequency ("IF"), or IF output from a DAC and upconversion of IF to RF. Moreover, these modules may be implemented with external transceivers having a JESD interface or with any other radio architecture.

The de-framer module 881 of the main FPGA 144 comprises a transport layer and a physical layer and is configured to receive uplink data from the framer module 876. In some embodiments, the de-framer module 881 may comprise, for example, an Ethernet layer or a custom point-to-point high-speed physical layer. The de-framer module 881 outputs the uplink data to the I/Q decompression module 882, which decompresses the uplink data and outputs decompressed I/Q data to the beamforming module 883. The beamforming module 883 can apply uplink beamforming weights that are received from the O-RAN module 820 to the decompressed I/Q data in the frequency domain.

In some embodiments, the PRACH module 884 may identify beamforming and I/Q data of a PRACH channel from the decompression module 882. Moreover, the SRS module 885 may extract SRS information from the I/Q decompression module 882.

The beamforming module 883, the PRACH module 884, and the SRS module 885 each provide their outputs to the O-RAN module 820. The O-RAN module 820 then provides its output to the Ethernet-plus-1588 module 810, which provides its output to the bidirectional Ethernet link 842. This output may comprise an electrical baseband data stream that is then converted into digital optical signals by one or more optical connector modules 140 coupled to the Ethernet link 842. The O-RAN module 820 can perform processing of all RT information, such as user-plane data and control-plane data. For example, control-plane information may include time/frequency-domain scheduling, beam forming, TDD, PRACH configuration, and/or data-compression parameters that can be processed by the O-RAN module 820.

Accordingly, processing functions can be split among the main FPGA 144 and the secondary FPGAs 146. In FIG. 8, this split in processing functionality is indicated by an imaginary line 855 that extends between the main FPGA 144 and the secondary FPGAs 146. According to other embodiments, however, the line 855 may be moved to the right to incorporate more modules into the main FPGA 144. For example, in the embodiment shown in FIG. 11, which will be described in detail below, the line 855 is to the right of the low-PHY modules 864, 872.

In still further embodiments, individual modules may be incorporated into the main FPGA 144 without also incorporating intervening modules that are shown in FIG. 8. As an example, the calibration modules 863, 873 may be incorporated into the main FPGA 144, while maintaining the de-framer module 861, the I/Q decompression module 862, the RT control module 866, the I/Q compression module 874, the PRACH module 875, and the framer module 876 in the secondary FPGAs 146.

Figure 9A:
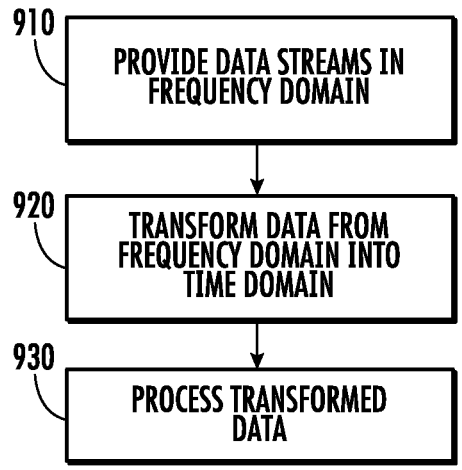
FIG. 9A is a flowchart of operations corresponding to downlink modules of FIG. 8.

FIG. 9A is a flowchart of operations corresponding to downlink modules of FIG. 8. The operations include providing (Block 910) a plurality of downlink data streams in the frequency domain. For example, the framer module 853 of the main FPGA 144 may provide the downlink data streams to the secondary FPGAs 146, respectively, after the main FPGA 144 uses its beamforming module 851 to apply downlink beamforming weights.

Data of the downlink data streams may be transformed (Block 920) from the frequency domain into the time domain. As an example, the low-PHY modules 864 of the secondary FPGAs 146 may perform IFFTs on the respective downlink data streams. In other embodiments, such as the embodiment shown in FIG. 11, the transformation (Block 920) from the frequency domain into the time domain may be performed by the main FPGA 144 rather than the secondary FPGAs 146.

Moreover, the secondary FPGAs 146 may process (Block 930) the time-domain data, such as by using the DUC/DFE module 865 to increase the data rate and/or the sample rate of the time-domain data. Accordingly, the operations shown in FIG. 9A correspond to at least one module of the main FPGA 144 and at least one module of the secondary FPGAs 146.

Figure 9B:
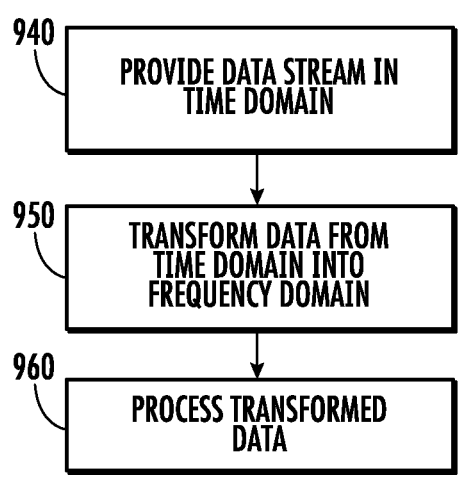
FIG. 9B is a flowchart of operations corresponding to uplink modules of FIG. 8.

FIG. 9B is a flowchart of operations corresponding to uplink modules of FIG. 8. The operations include providing (Block 940) uplink data streams in the time domain. For example, the secondary FPGAs 146 may receive uplink data streams via radiating elements 184 (FIG. 4) of the active antenna module 100.

The operations also include transforming (Block 950) data of the uplink data streams from the time domain into the frequency domain. As an example, the low-PHY module 872 of each secondary FPGA 146 may perform an FFT on a respective uplink data stream. In other embodiments, such as the embodiment shown in FIG. 11, the transformation (Block 950) from the time domain into the frequency domain may be performed by the main FPGA 144 rather than the secondary FPGAs 146.

Moreover, the main FPGA 144 may process (Block 960) the time-domain data, such as by using the beamforming module 883 to apply, in the frequency domain, uplink beamforming weights to I/Q data of the uplink data streams. In some embodiments, processing the frequency-domain data may further include using the I/Q decompression module 882, the PRACH module 884, and/or the SRS module 885 of the main FPGA 144.

Figure 10A:
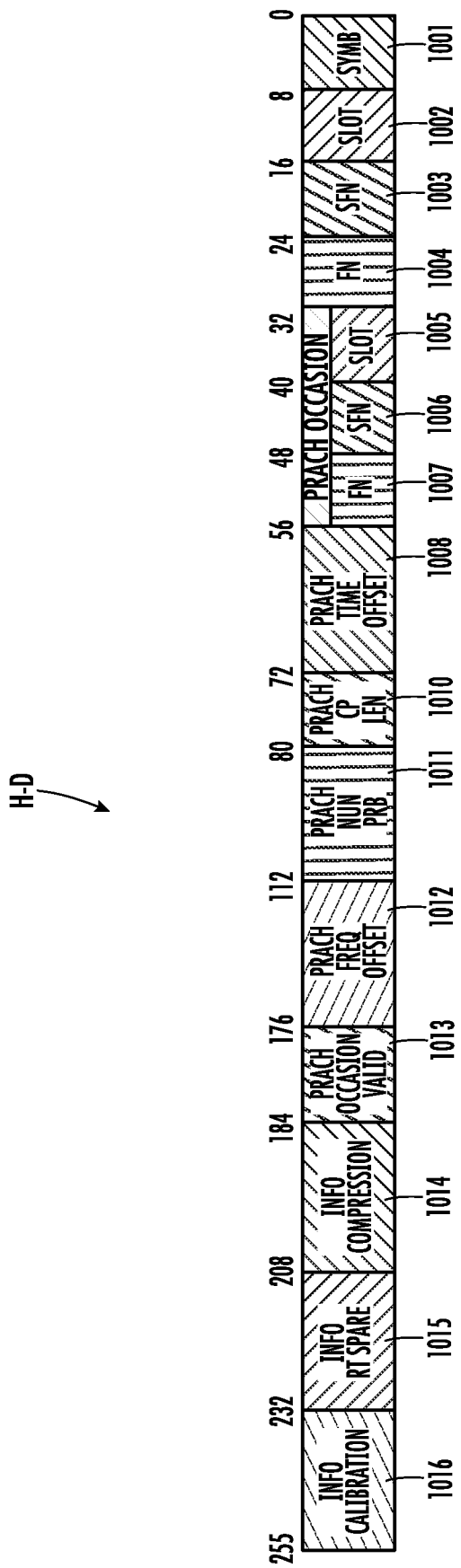
FIG. 10A is a schematic block diagram of a header of a downlink data stream that is output from the main field programmable gate array of FIG. 8 to the first of the secondary field programmable gate arrays of FIG. 8.

FIG. 10A is a schematic block diagram of a header H-D of a downlink data stream that is output from the main FPGA 144 of FIG. 8 to the first FPGA 146-1 of the secondary FPGAs 146 of FIG. 8. Each downlink data stream that the main FPGA 144 outputs may have a respective header H-D, which may include control-plane information that is sent to a respective secondary FPGA 146. For example, the control-plane information may comprise timing information, such as symbol information 1001, slot information 1002, a frame number 1004 of a radio frame, and/or a sub-frame number 1003 of the radio frame.

In some embodiments, the control-plane information may comprise information regarding a PRACH occasion, such as slot information 1005, a sub-frame number 1006, and/or a frame number 1007 for the PRACH occasion. Moreover, the control-plane information may comprise PRACH time-offset information 1008, PRACH CP length information 1010, PRACH physical resource block ("PRB") information 1011, PRACH frequency-offset information 1012, and/or PRACH occasion-valid information 1013. Other control-plane information in the header H-D may include data-compression information 1014, RT spare information 1015, and/or calibration information 1016.

The header H-D may, in some embodiments, be word #0 of a downlink transmission having a 30 kHz sub-carrier spacing ("SCS") configuration. For example, in a transmission having frequency points 0 through 4,096, frequency points 0 through 3,275 may comprise data, and a guard section (e.g., guard band) comprising a gap between frequency points 3,275 and 4,096 may provide space for the header H-D and space for relaxed timing requirements.

Figure 10B:
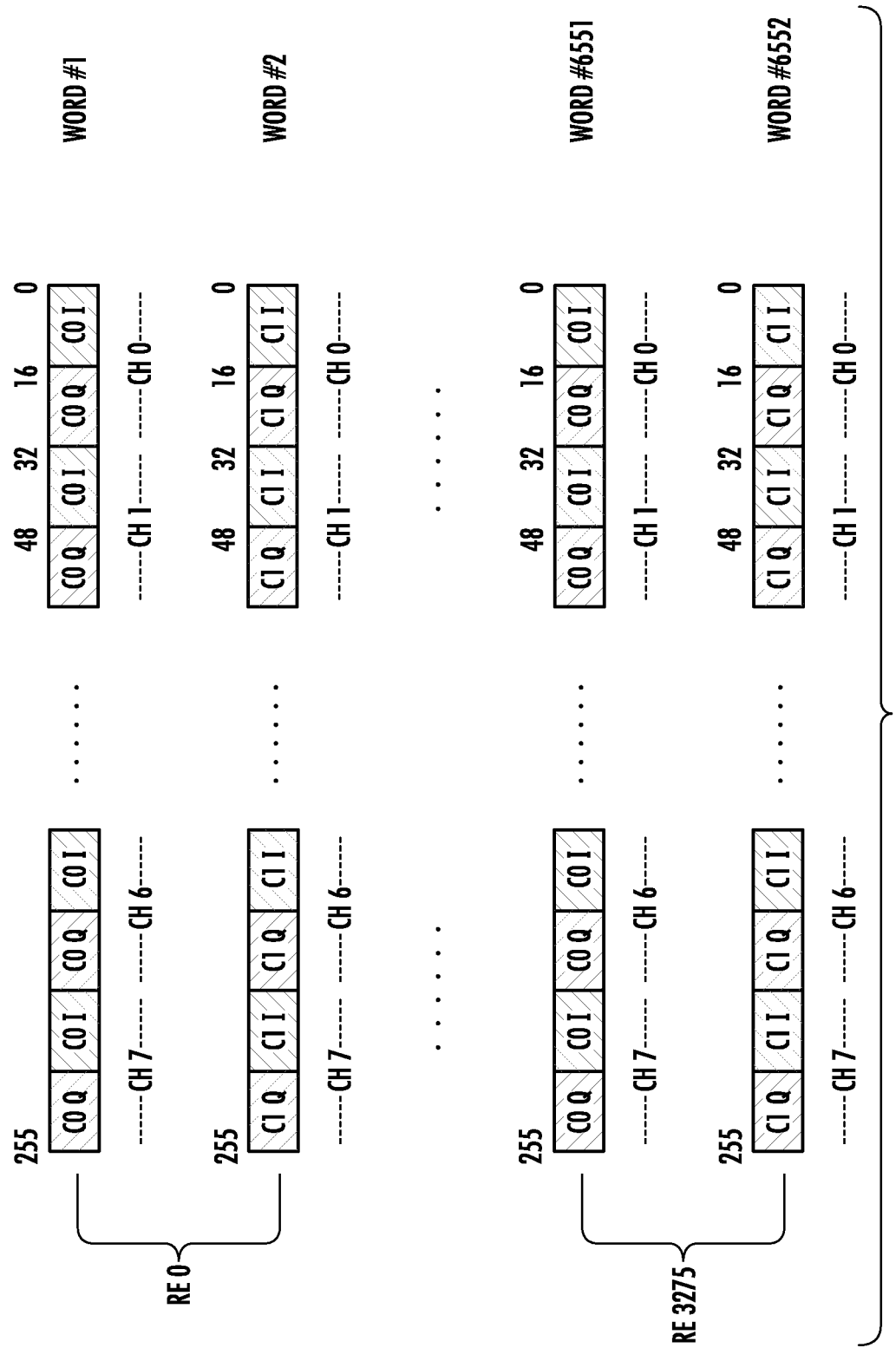
FIG. 10B is a schematic block diagram of user data of the downlink data stream of FIG. 10A for a specific example use case.

FIG. 10B is a schematic block diagram of user (e.g., user-plane) data of the downlink data stream of FIG. 10A, where FIGS. 10A and 10B collectively illustrate a protocol for downlink communications from the main FPGA 144 to the secondary FPGAs 146. In particular, FIG. 10B illustrates a specific example use case in which the downlink data stream comprises (i) the specific 5G numerology 1 (SCS of 30 kHz), (ii) a carrier bandwidth of 100 MHZ, (iii) two different component carriers (C0, C1), and (iv) eight data streams for eight different antenna paths handled by the first FPGA 146-1 of the secondary FPGAs 146.

The user data may include I/Q data for each of the frequency points 0 through 3,275. Moreover, each frequency point may comprise two words of the downlink transmission. For example, the frequency point 0 may include word #1 and word #2 of the transmission. Each word may comprise 256 bits. Word #1 may include data C0 Q, C0 I for each of eight RF channels of the active antenna module 100. Similarly, word #2 may include data C1 Q, C1 I for each of the eight channels. In the use case of the present example, two words for each frequency point are used because two different component carriers C0, C1 are being transferred for eight different antenna paths. This pattern may be continued through the frequency point 3,275, which may include word #6,551 having data C0 Q, C0 I for each of the eight channels and word #6,552 having data C1 Q, C1 I for each of the eight channels. Referring again to FIG. 8, upon receiving the downlink data stream from the main FPGA 144, the low-PHY 864 of the secondary FPGA 146 may convert each of the frequency points 0 through 3,275 to the time domain.

FIG. 10B illustrates an example that is based on the specific 5G numerology 1 and a carrier bandwidth of 100 MHz. The present invention, however, is not limited to either a 100 MHz carrier bandwidth or to a 30 kHz SCS. Accordingly, the active antenna module 100 may use a downlink protocol between the main FPGA 144 and the secondary FPGAs 146 that has a carrier bandwidth other than 100 MHz and/or an SCS other than 30 kHz. A downlink protocol comprising both control-plane information and user-plane data for transmission to the secondary FPGAs 146 may thus be used for any numerology defined by 5G.

If the carrier bandwidth (e.g., 100 MHz), which is proportional to the number of words in a transmission, changes, then the number of sub-carriers will also change. Moreover, a change in SCS will result in a timing (e.g., symbol spacing) change.

Figure 10C:
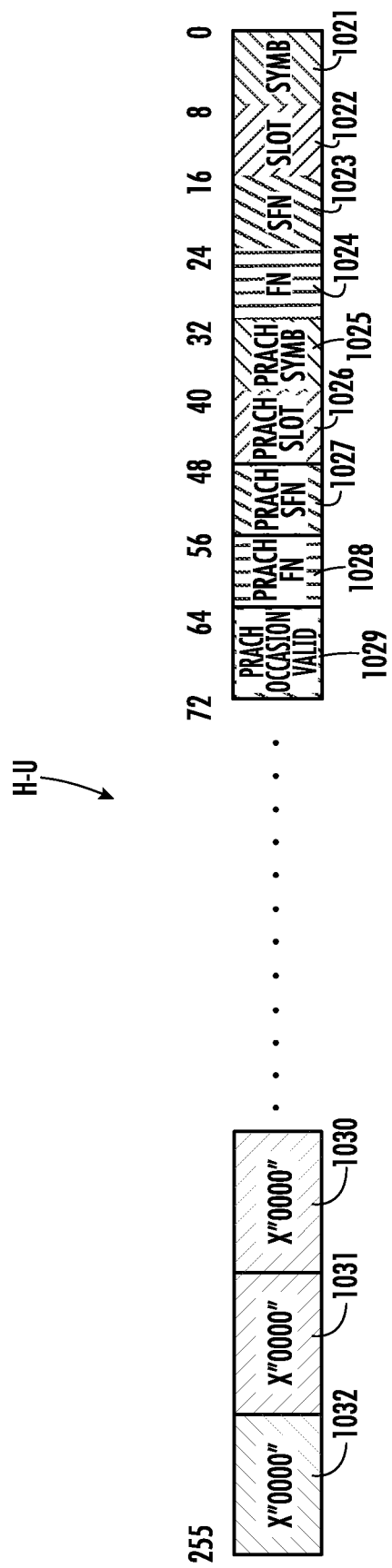
FIG. 10C is a schematic block diagram of a header of an uplink data stream that is input from the first of the secondary field programmable gate arrays of FIG. 8 to the main field programmable gate array of FIG. 8.

FIG. 10C is a schematic block diagram of a header H-U of an uplink data stream that is input from the first FPGA 146-1 of the secondary FPGAs 146 of FIG. 8 to the main FPGA 144 of FIG. 8. As with the downlink data streams, each uplink data stream may, in some embodiments, be a transmission having a 30 kHz SCS configuration. Each of the secondary FPGAs 146 may provide a respective uplink data stream having a respective header H-U to the main FPGA 144.

For example, each uplink data stream may include word #0 through word #6,830, where the header H-U may be word #0. The header H-U may comprise timing information, such as symbol information 1021, slot information 1022, a frame number 1024 of a radio frame, and/or a sub-frame number 1023 of the radio frame. Moreover, the header H-U may comprise PRACH information, such as PRACH symbol information 1025, PRACH slot information 1026, a PRACH sub-frame number 1027, a PRACH frame number 1028, and/or PRACH occasional valid information 1029.

In some embodiments, the header H-U may comprise further information 1030-1032. Moreover, the header H-U may, in some embodiments, include data-compression information that is not shown in FIG. 10C.

Though the headers H-U, H-D are part of a packet-based protocol, the protocol can generate a simple, almost-continuous and almost-synchronous, data flow. For example, the post-O-RAN interface of the main processor 144 may always send data streams to the secondary processors 146, even if no data is available from the O-RAN front-haul interface of the main processor 144. In this case, dummy "zero" values are sent to the secondary processors 146 for processing (e.g., for performance of an IFFT on the values) by the low-PHY 864. Accordingly, by sending the dummy values, the main processor 144 can continue to send the data streams when the O-RAN front-haul interface does not output data to the post-O-RAN interface. As an example, the framer 853 of the post-O-RAN interface can generate and transmit the dummy values when the O-RAN front-haul interface has no data to transmit, such that the framer 853 provides an almost-continuous data stream to the de-framer 861 of a secondary FPGA 146.

Moreover, as scheduling information may be processed in the main FPGA 144, links between the main FPGA 144 and the secondary FPGAs 146 may be almost synchronous. Also, the headers H-U, H-D may be implemented in a time and frequency guard of an orthogonal frequency-division multiplexing ("OFDM") system to send RT control information (i.e., control-plane information).

Using the present invention's internal split (between the main FPGA 144 and the secondary FPGAs 146) of processing along with the protocol of the present invention, the active antenna module 100 can take advantage of unused frequency points in an OFDM modulation (e.g., in a frequency guard thereof) and avoid the transmission of zeros corresponding to the unused frequency points. For example, as idle time/frequency resources in the guard section (e.g., guard band) of a transmission may not be scheduled, implementation of the protocol may be simplified and overhead of the protocol may be reduced. Moreover, a cyclic prefix can be added in the time domain, thus giving an additional time gap between consecutive symbols. The difference between the throughput required in the time domain as compared with the frequency domain may be the maximum bandwidth available for control-data overhead.

Figure 10D:
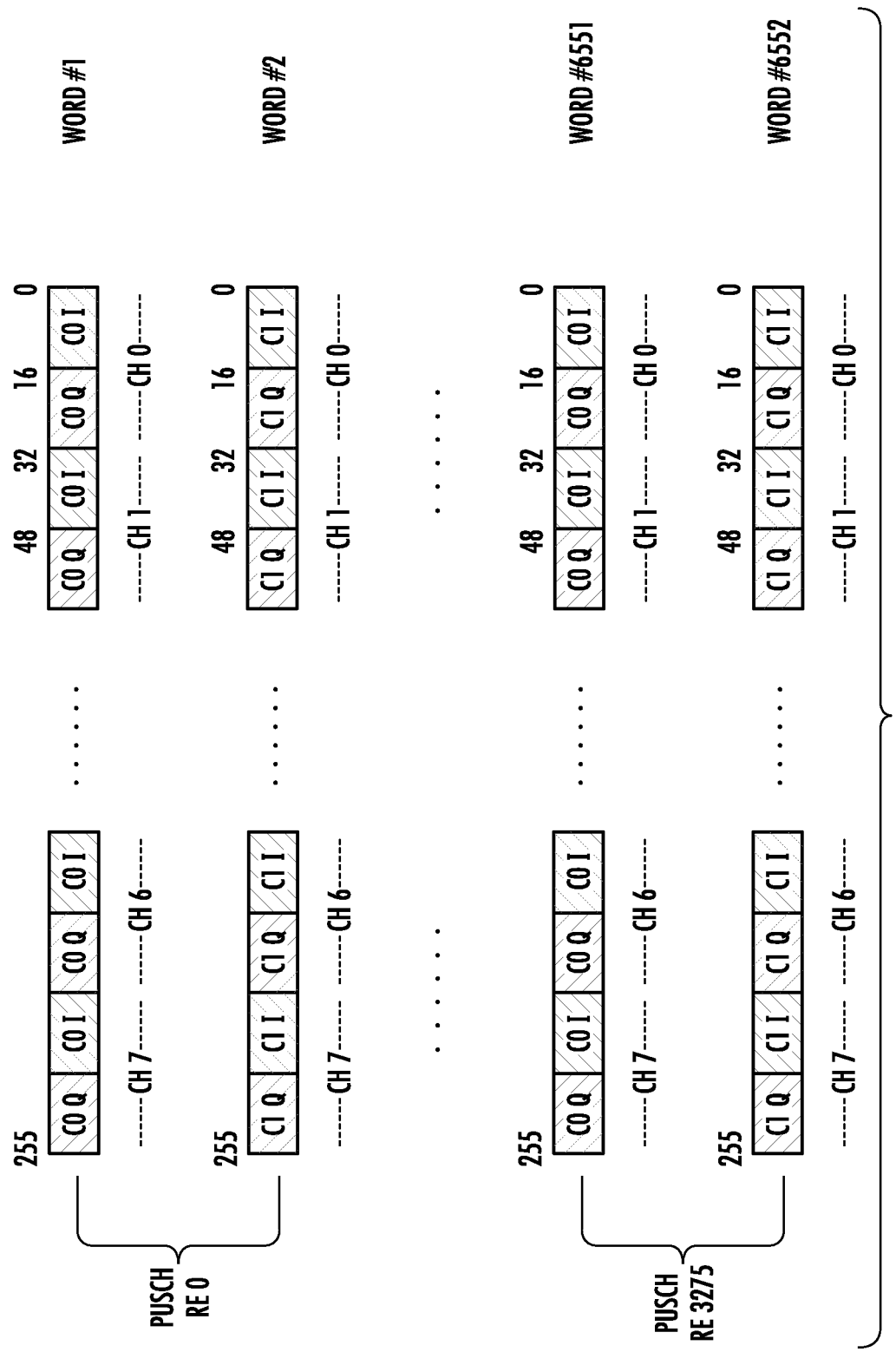
FIG. 10D is a schematic block diagram of user data of the uplink data stream of FIG. 10C for a specific example use case.

FIG. 10D is a schematic block diagram of user (e.g., user-plane) data of the uplink data stream of FIG. 10C. In particular, FIG. 10D illustrates a specific example use case in which the uplink data stream comprises (i) the specific 5G numerology 1 (SCS of 30 kHz), (ii) a carrier bandwidth of 100 MHz, (iii) two different component carriers (C0, C1), and (iv) eight data streams for eight different antenna paths handled by the first FPGA 146-1 of the secondary FPGAs 146.

For example, each uplink data stream includes physical uplink shared channel ("PUSCH") data having frequency points 0 through 3,275. The frequency point 0 may include word #1 and word #2 of the uplink transmission, where word #1 may include data C0 Q, C0 I for each of eight RF channels of the active antenna module 100 and word #2 may include data C1 Q, C1 I (where C0 and C1 refer to two different component carriers) for each of the eight channels. This pattern may be continued through the frequency point 3,275, which may include word #6,551 having data C0 Q, C0 I for each of the eight channels and word #6,552 having data C1 Q, C1 I for each of the eight channels.

Though FIG. 10D illustrates an example that is based on the specific 5G numerology 1 and a carrier bandwidth of 100 MHz, the present invention is not limited to either a 100 MHz carrier bandwidth or to a 30 kHz SCS. Accordingly, the active antenna module 100 may use an uplink protocol between the secondary FPGAs 146 and the main FPGA 144 that has a carrier bandwidth other than 100 MHz and/or an SCS other than 30 kHz. An uplink protocol comprising both control-plane information and user-plane data for transmission from the secondary FPGAs 146 to the main FPGA 144 may thus be used for any numerology defined by 5G.

Figure 10E:
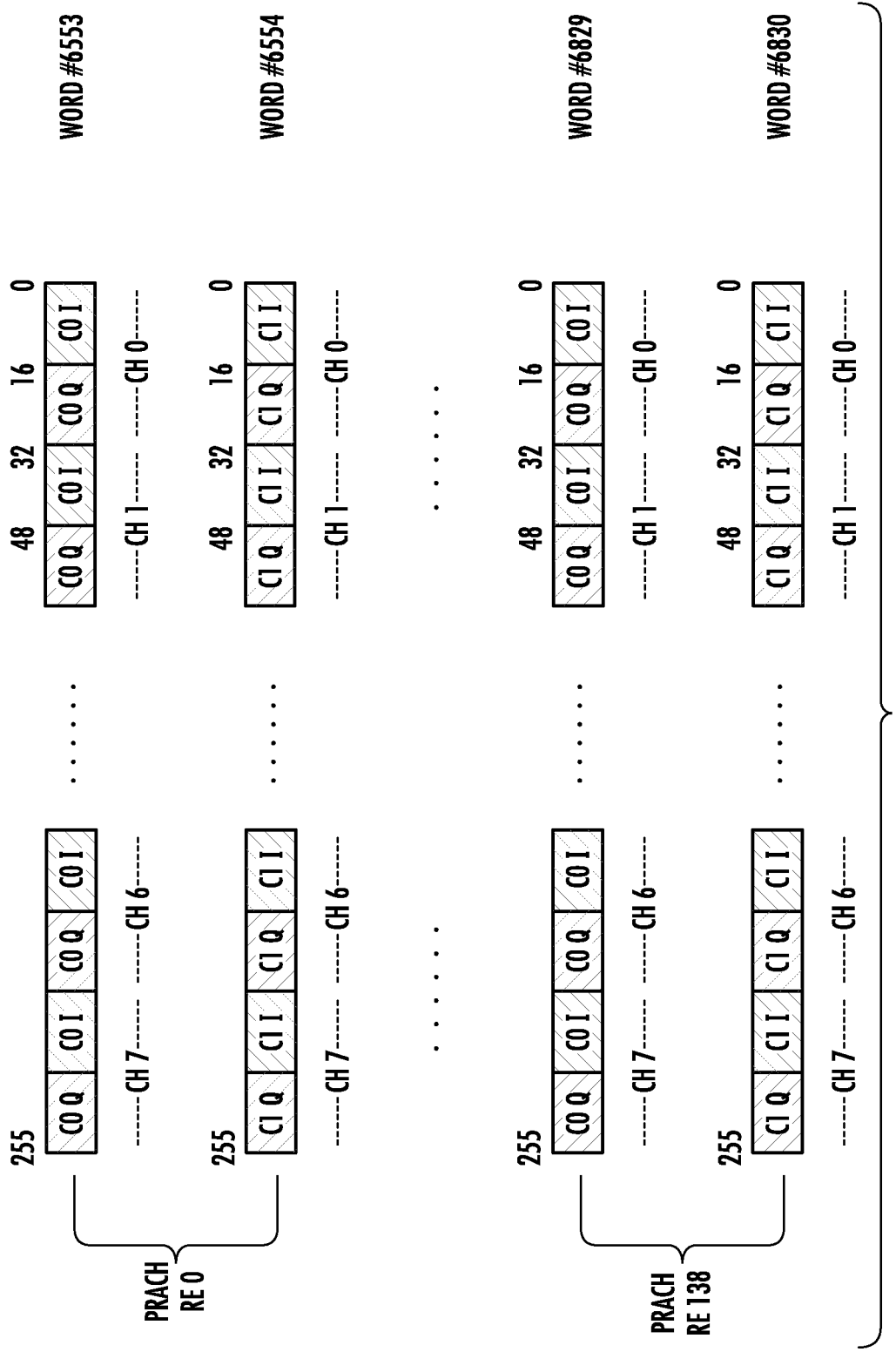
FIG. 10E is a schematic block diagram of physical random access channel data of the uplink data stream of FIG. 10C.

FIG. 10E is a schematic block diagram of PRACH data (e.g., for short preamble random access) of the uplink data stream of FIG. 10C, where FIGS. 10C-10E collectively illustrate a protocol for uplink communications from the secondary FPGAs 146 to the main FPGA 144. For example, the PRACH data may include 139 PRACH frequency points, which may comprise word #6,553 through word #6,830 of the uplink transmission. As an example, the PRACH frequency point 0 may comprise word #6,553 and word #6,554, where word #6,553 may include data C0 Q, C0 I for each of eight RF channels of the active antenna module 100 and word #6,554 may include data C1 Q, C1 I for each of the eight channels. This pattern may be continued through the PRACH frequency point 138, which may include word #6,829 having data C0 Q, C0 I for each of the eight channels and word #6,830 having data C1 Q, C1 I for each of the eight channels.

In some embodiments, a user plane and a control plane of the downlink and uplink protocols for transmissions between the main FPGA 144 and the secondary FPGAs 146 may be different from a user plane and a control plane of the O-RAN module 820. For example, user-plane data and control-plane information of the downlink/uplink protocol may differ from that of the O-RAN module 820.

Figure 11:
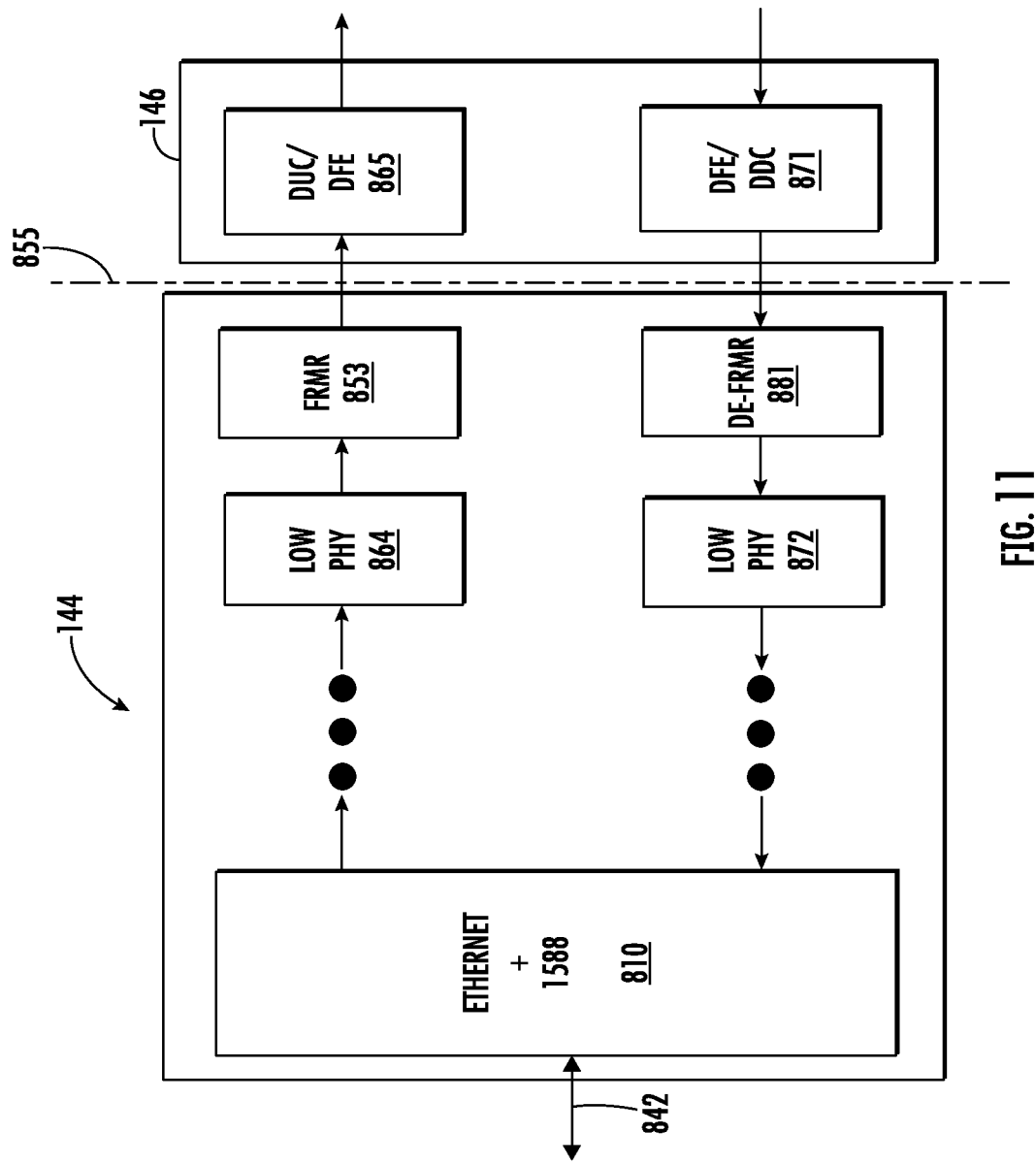
FIG. 11 is a schematic block diagram of modules of the main field programmable gate array, and modules of a first of the secondary field programmable gate arrays, of FIG. 6, according to other embodiments of the present invention.

FIG. 11 is a schematic block diagram of modules of the main FPGA 144, and modules of a first of the secondary FPGAs 146, of FIG. 6, according to other embodiments of the present invention. For simplicity of illustration, only one secondary FPGA 146 is shown in FIG. 11. Others of the secondary FPGAs 146, however, can have the same arrangement of modules therein.

As shown in FIG. 11, the main FPGA 144 may include the low-PHY module 864 in its downlink path and the low-PHY module 872 in its uplink path. For example, the main FPGA 144 may use the low-PHY 864 to transform data from the frequency domain into the time domain. Conversely, the main FPGA 144 may use the low-PHY 872 to transform data from the time domain into the frequency domain. Moreover, the framer module 853 of the main FPGA 144 may send time-domain data that is output by the low-PHY 864 to the DUC/DFE module 865 of the secondary FPGA 146 for further processing. The de-framer module 881 of the main FPGA 144 may likewise receive an uplink data stream in the time domain from the DFE/DDC 871 of the secondary FPGA 146, and may output time-domain data to the low-PHY 872.

The transformation into the time domain by the main FPGA 144 for a downlink data stream follows processing that the main FPGA 144 performs (e.g., using its beamforming module 851 (FIG. 8)) on an input data stream to provide a plurality of data streams in the frequency domain. Accordingly, the main FPGA 144 can transform the frequency-domain data streams into respective time-domain data streams that the main FPGA 144 outputs via its framer module 853 to a plurality of secondary FPGAs 146, respectively. The secondary FPGAs 146 can then use their DUC/DFE modules 865 to perform further processing on the respective data streams in the time domain.

The transformation into the frequency domain by the main FPGA 144 for an uplink data stream follows processing that the secondary FPGA 146 performs using its DFE/DDC module 871 in the time domain. Moreover, the main FPGA 144 can perform further processing (e.g., using its beamforming module 883 (FIG. 8)) in the frequency domain before outputting the data stream to a baseband unit via an Ethernet link 842 (FIG. 8). Specifically, the main FPGA 144 can transform and further process each of a plurality of data streams that it receives via its de-framer module 881 from a plurality of secondary FPGAs 146, respectively.

In some embodiments, an active antenna module 100 that splits processing functionality between the main FPGA 144 and the secondary FPGAs 146 as indicated by the position of the imaginary line 855 that is shown in FIG. 11 may not require a header H (FIGS. 10A and 10C) for transmissions between the main FPGA 144 and the secondary FPGAs 146. Specifically, the amount of control-plane information used when the line 855 is at the position shown in FIG. 11 may be reduced relative to when the line 855 is at the position shown in FIG. 8. For example, when the main FPGA 144 of FIG. 11 includes the I/Q decompression module 862 (FIG. 8), the I/Q compression module 874 (FIG. 8), the calibration modules 863, 873, and the low-PHY modules 864, 872, communication of calibration information 1016 (FIG. 10A), compression information 1014 (FIG. 10A), and timing information between the main FPGA 144 and the secondary FPGAs 146 may no longer be required.

Antennas according to embodiments of the present invention may provide a number of advantages. For example, referring to FIG. 8, splitting processing functions/resources between the main FPGA 144 and the secondary FPGAs 146 reduces processing requirements for the main FPGA 144, thus allowing the main FPGA 144 to be smaller, which can reduce cost and enable better heat dissipation. This split may also relax timing requirements. Accordingly, control-plane information may be communicated between the main FPGA 144 and the secondary FPGAs 146 in gaps that are provided by guard sections (in frequency and time) in downlink and uplink transmissions.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. An active antenna comprising:
a main processor comprising an O-RAN front-haul interface and a post-O-RAN interface that is coupled to an output of the O-RAN front-haul interface, the post-O-RAN interface being configured to parse user-plane packets and control-plane packets received from the O-RAN front-haul interface to provide a plurality of output data streams in a frequency domain; and
a plurality of secondary processors that are configured to receive the output data streams, respectively, from the main processor and to transform data of the output data streams from the frequency domain into a time domain.

2. The active antenna of claim 1, wherein the post-O-RAN interface of the main processor is further configured to apply a plurality of beamforming weights in the frequency domain.

3. The active antenna of claim 2, wherein the post-O-RAN interface of the main processor is still further configured to compress beamforming-weighted data.

4. The active antenna of claim 1, wherein the O-RAN front-haul interface of the main processor is configured to receive an input data stream via an Ethernet link and to output the user-plane packets and the control-plane packets to the post-O-RAN interface of the main processor based on the input data stream.

5. The active antenna of claim 4, further comprising an optical connector that is coupled between the Ethernet link and a baseband unit.

6. The active antenna of claim 1,
wherein the data of the output data streams comprises user-plane data of a protocol for downlink communications from the main processor to the secondary processors,
wherein the output data streams further comprise control-plane information of the protocol, and
wherein the secondary processors are further configured to separate the user-plane data of the protocol from the control-plane information of the protocol.

7. The active antenna of claim 6, wherein the secondary processors are still further configured to:
decompress the user-plane data of the protocol; and
apply antenna calibration parameters to the user-plane data of the protocol in the frequency domain.

8. The active antenna of claim 1, wherein the post-O-RAN interface of the main processor is further configured to apply antenna calibration parameters in the frequency domain.

9. The active antenna of claim 1,
wherein the main processor comprises a main field-programmable gate array (FPGA), and
wherein the secondary processors comprise a plurality of secondary FPGAs, respectively, that are coupled to the main FPGA.

10. The active antenna of claim 1, further comprising an array of radiating elements,
wherein the main processor and the secondary processors are on a back side of the array of radiating elements.

11. The active antenna of claim 1, wherein the main processor further comprises a pre-O-RAN interface that is coupled to an input of the O-RAN front-haul interface, the pre-O-RAN interface being configured to generate user-plane packets using data received from the secondary processors through a protocol for uplink communications from the secondary processors to the main processor.

12. The active antenna of claim 1, wherein the post-O-RAN interface of the main processor is further configured to continue sending the output data streams to the secondary processors when no data is available from the O-RAN front-haul interface of the main processor.

13. The active antenna of claim 12, wherein the output data streams comprise dummy values when no data is available from the O-RAN front-haul interface of the main processor.

14. An active antenna comprising:
a main processor comprising an O-RAN front-haul interface and a post-O-RAN interface that is coupled to an output of the O-RAN front-haul interface; and
a plurality of secondary processors,
wherein the main processor is configured to output a plurality of data streams in a frequency domain to the secondary processors, respectively, each of the data streams comprising a header that includes control-plane information,
wherein each of the data streams comprises a guard section, and
wherein the header that includes the control-plane information is in the guard section.

15. The active antenna of claim 14,
wherein the data streams comprise respective downlink data streams, and
wherein the main processor is further configured to receive a plurality of uplink data streams from the secondary processors, respectively, each of the uplink data streams comprising user-plane data and a header.

16. The active antenna of claim 14, wherein each of the data streams further comprises I/Q data for a plurality of radio frequency (RF) channels.

17. The active antenna of claim 16,
wherein the header that includes the control-plane information is in a first word of a first of the data streams, and
wherein a first frequency point of the first of the data streams comprises I/Q data in a second word of the first of the data streams.

18. The active antenna of claim 17, wherein the first word of the header has a first number of bits that is equal to a second number of bits of the second word that has the I/Q data therein.

19. The active antenna of claim 14, wherein the header that includes the control-plane information is part of a packet-based protocol that also includes I/Q data.

* * * * *